Figure 1:
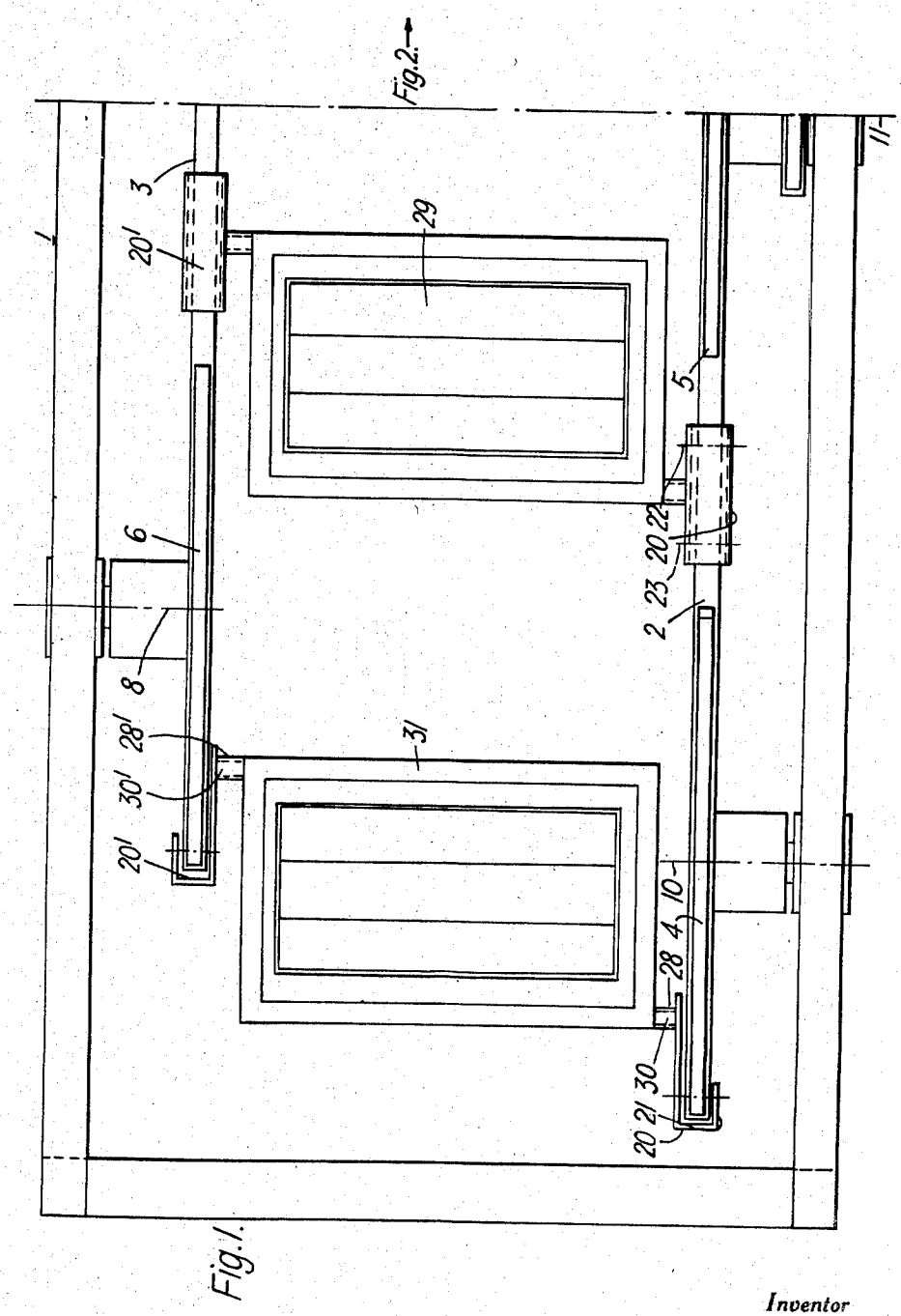

May 12, 1959  G. X. LENS  2,886,166
CONVEYORS
Filed Feb. 10, 1955  10 Sheets-Sheet 3

*Inventor*
G. X. LENS
By
*Attorney*

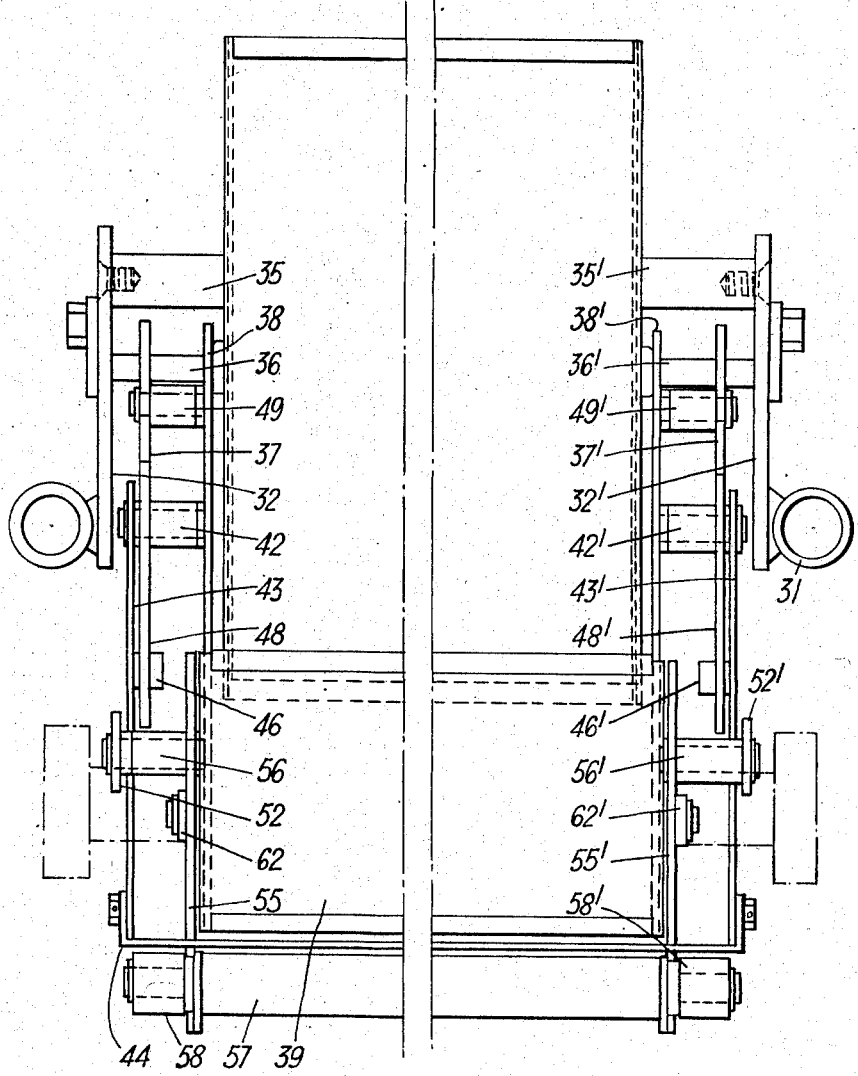

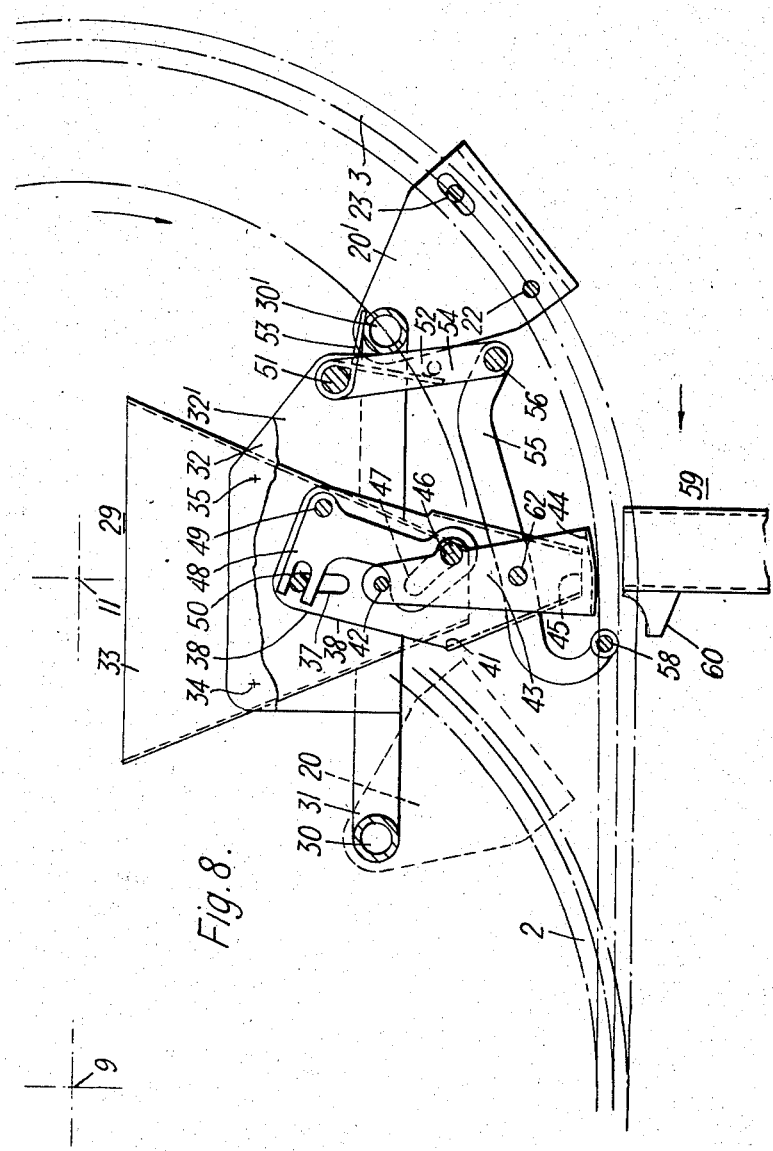

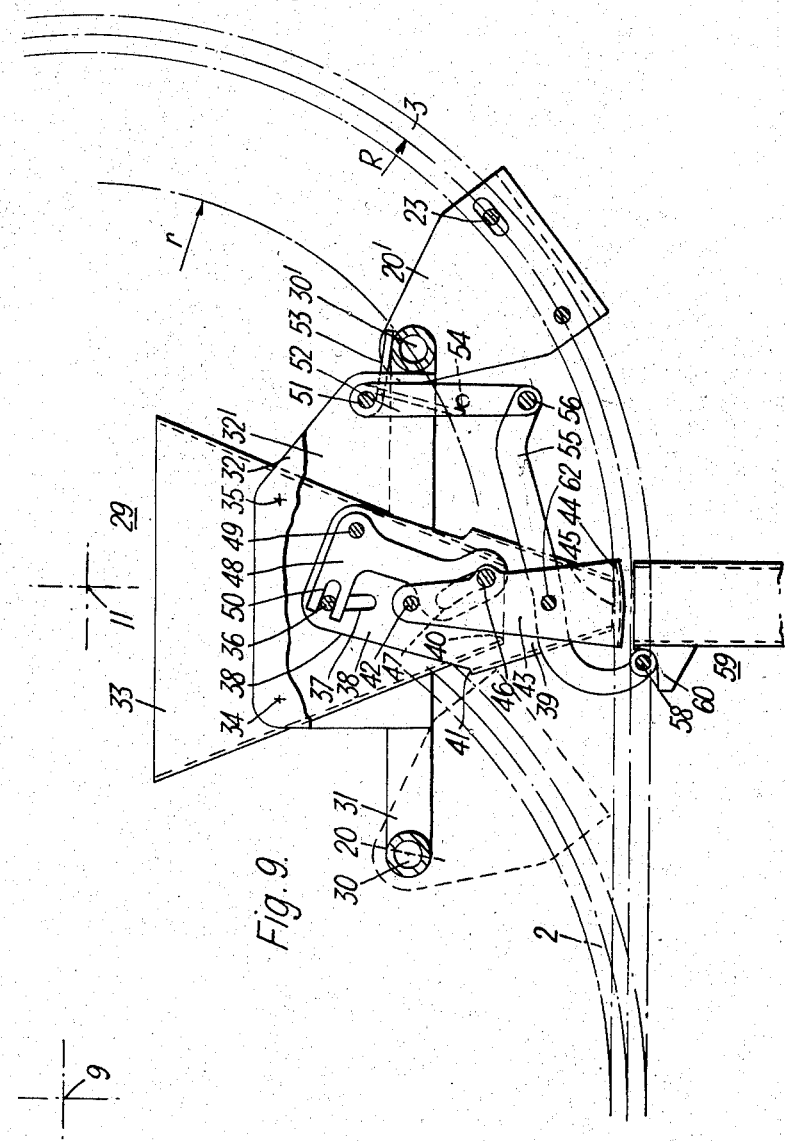

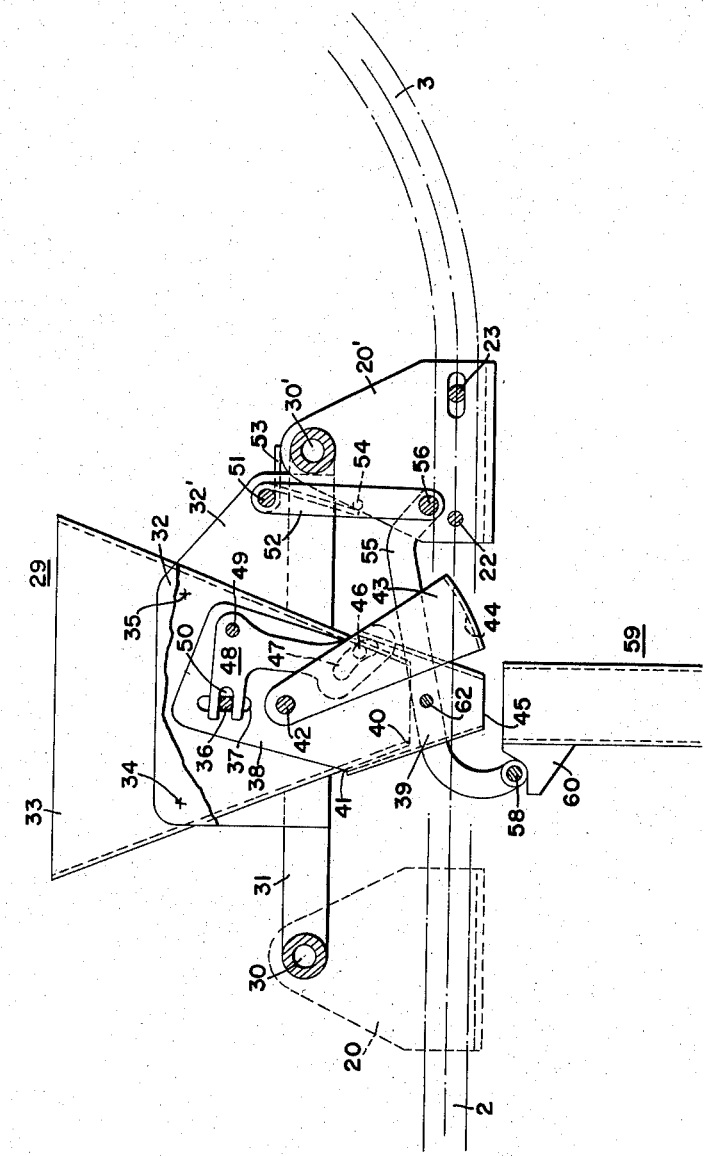

United States Patent Office 2,886,166
Patented May 12, 1959

2,886,166

CONVEYORS

Georges Xavier Lens, Antwerp, Belgium, assignor to International Standard Electric Corporation, New York, N.Y., a corporation of Delaware Application February 10, 1955, Serial No. 487,414

Claims priority, application Belgium February 26, 1954

6 Claims. (Cl. 198—75)

The invention relates to a sorting machine for letters or other similar flat objects of determined dimensions.

In United States Patent No. 2,689,657, issued September 21, 1954, there has been described the manner in which the letter-holders of an intermediate chain conveyor are periodically brought into conjunction with those of a main chain conveyor and the manner in which the transfer of a letter, first to a letter-holder of the intermediate chain conveyor and secondly to a letter-holder of the main chain conveyor is carried out.

In the device described in the before-mentioned U.S. patent the letter-holders of the intermediate chain conveyor pass rather rapidly below a feeding turnstile so that the letter-holders must have a multiform structure to receive securely the letters. Further, due to miscellaneous stresses to which the main chain conveyor is subject, it is sometimes necessary to make adjustments to it. It is therefore also necessary to readjust the letter-holder positions on the intermediate chain conveyor so as to maintain the conjunction between the letter-holders of the two chains conveyors in all positions. Finally the multiform structure of the letter-holders on the intermediate chain conveyor requires a trigger mechanism of which the adjustment depends on the adjustment of the intermediate chain conveyor.

The object of the present invention is to overcome these drawbacks and to provide an intermediate chain conveyor with letter-holders the conjunction of which with those of the main chain conveyor is more efficient.

According to a feature of the invention the letter-holders of the intermediate chain conveyor are mounted on support members which maintain them a certain distance from the conveyor chains, so that when passing the curves, the instantaneous center of rotation of the letter-holders is located on a circumference having a smaller radius than the radius of curvature of the chains themselves.

According to another feature of the invention, a letter-holder of the intermediate chain conveyor is rigidly mounted on its supports and its orifice is extended by a mobile sheath obturated by a shutter the opening of which is effected by movement of the mobile sheath.

According to another feature of the invention, the mobile sheath is articulated on the letter-holder of the intermediate chain conveyor so as to be able to perform a rotary movement and a radial movement with respect to the center of oscillation in such a way that the rotary movement of the sheath has no effect on the shutter whereas the radial movement causes the opening of the latter.

According to another feature of the invention, the opening of the shutter of the letter-holder of the intermediate chain conveyor is effected by the radial movement of the sheath and is obtained as a result of the sliding of an element of said shutter along the profile of an intermediate member articulated on the sheath and bearing against the axis of rotation of the latter, a restoring spring being provided for the restoration of the shutter.

According to another feature of the invention, a lever controls the rotary and radial translation of the mobile sheath through its free extremity engaging a stop member fixed to the letter-holder on the main chain conveyor.

Figure 2:
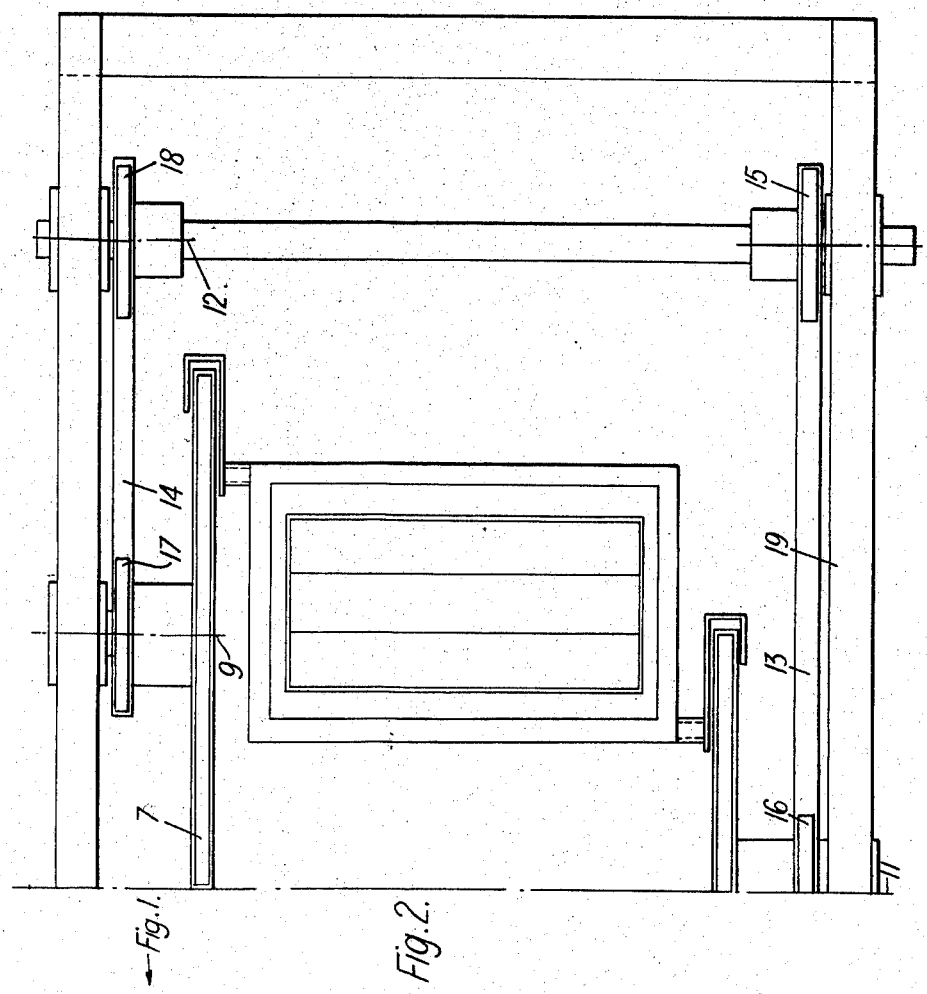
Figure 3:
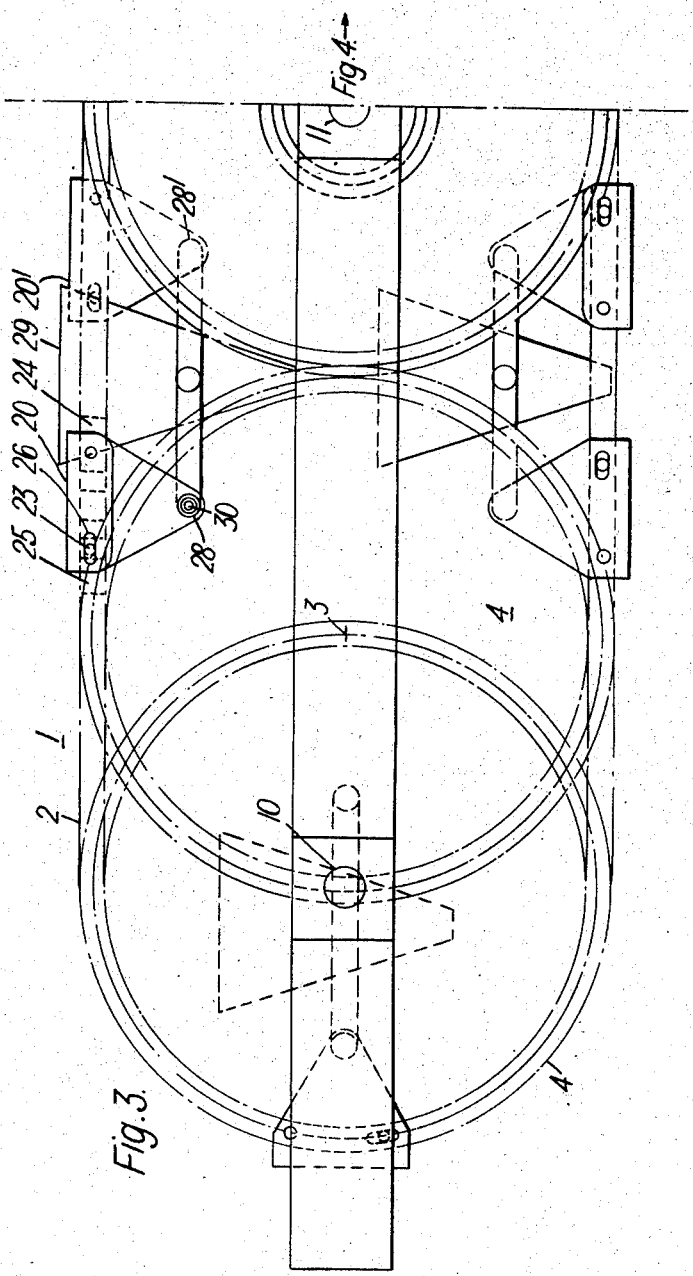
Figure 4:
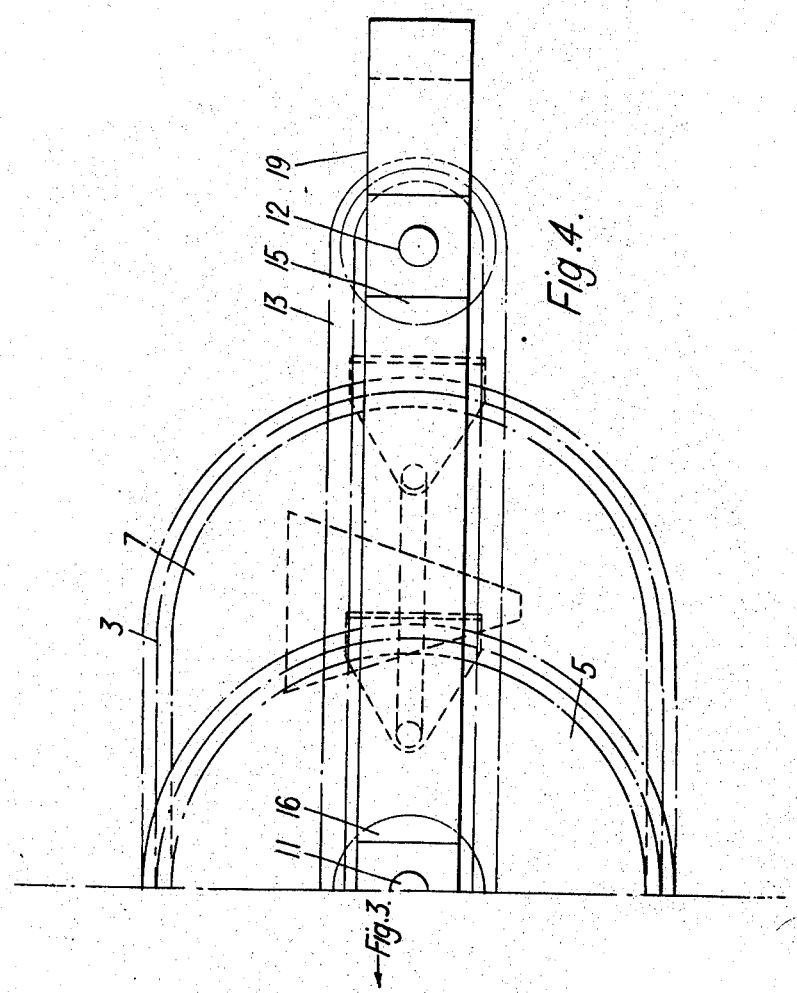
Figure 5:
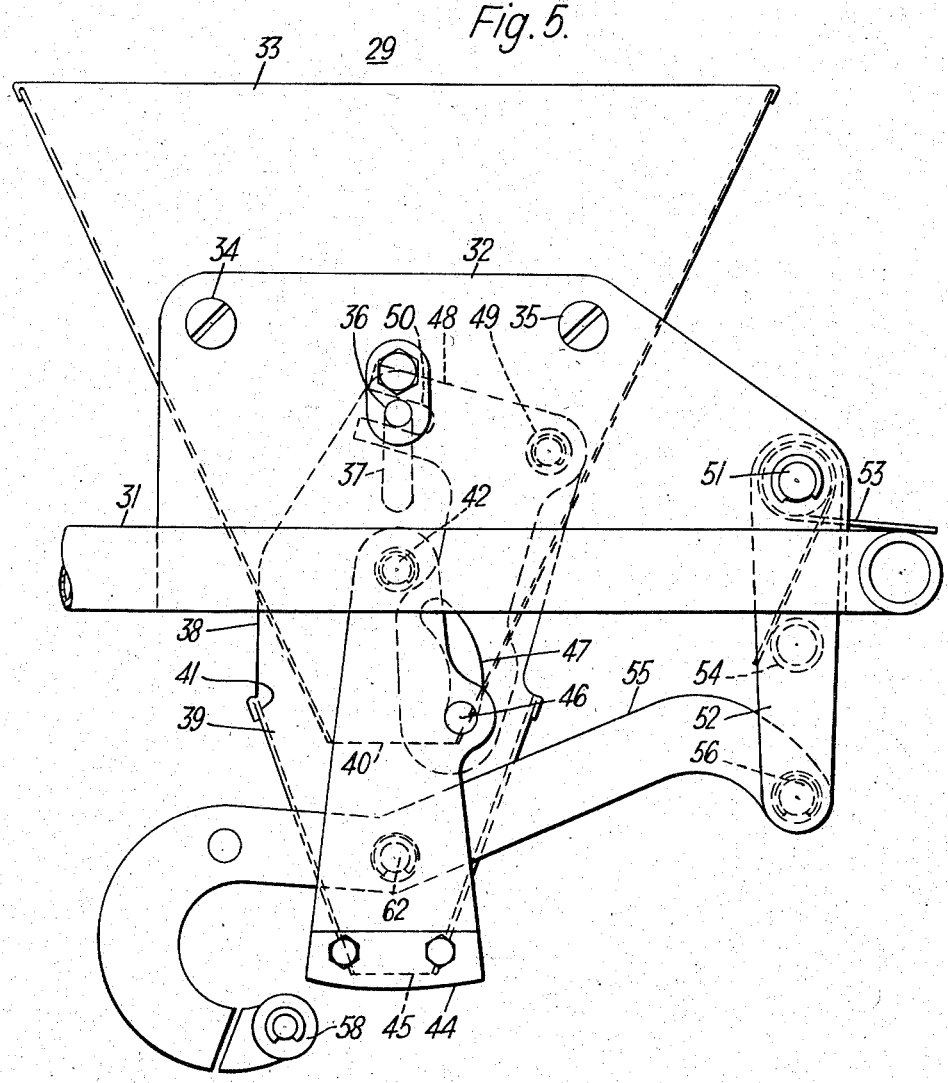
Figure 6:
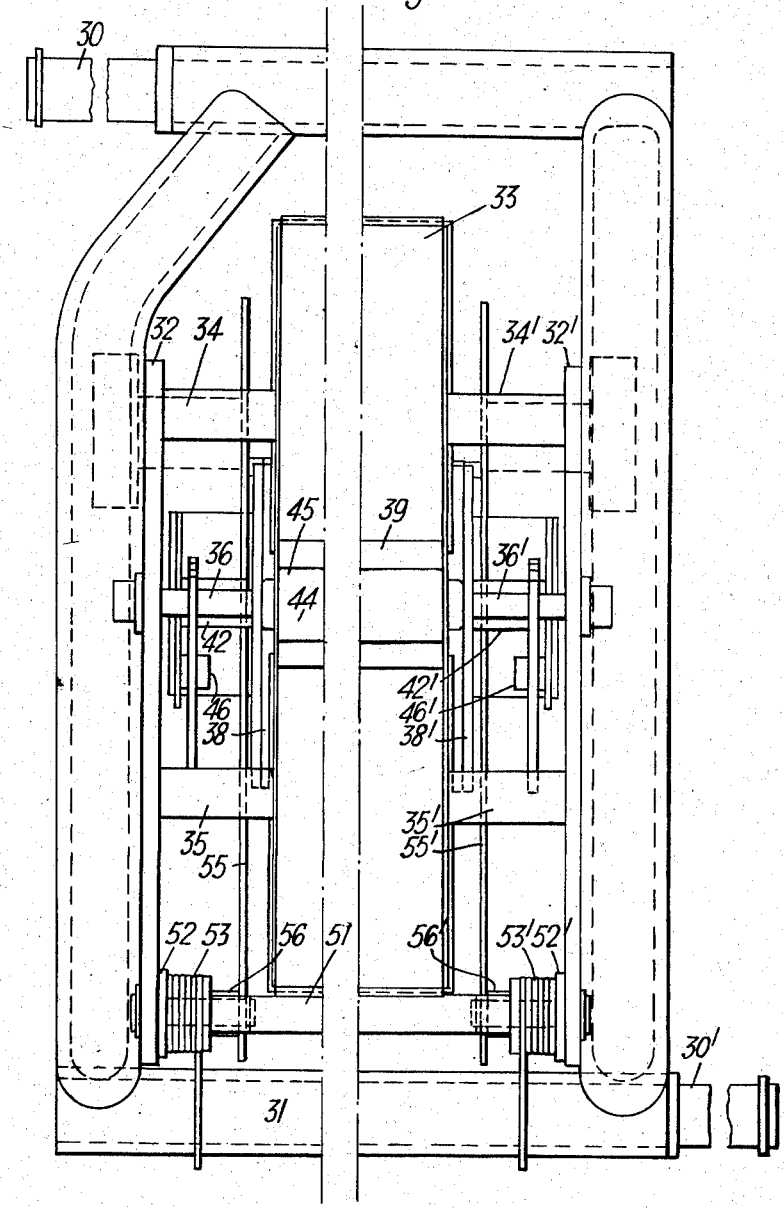

The above mentioned and other objects and features of the invention will become more apparent and the invention itself will be best understood by referring to the following description of an embodiment taken in conjunction with the accompanying drawings in which:

Figs. 1 and 2, with Fig. 2 placed to the right of Fig. 1, show in plan view the intermediate chain conveyor, Figs. 3 and 4, with Fig. 4 placed to the right of Fig. 3, show in side view the intermediate chain conveyor, Fig. 5 is a side view of a letter-holder assemblage for the intermediate chain conveyor, Fig. 6 is a plan view of the letter-holder of Fig. 5, Fig. 7 is an end elevation of the letter-holder of Fig. 5, and Figs. 8, 9 and 10 are side views of a letter-holder of the intermediate chain conveyor in conjunction with a letter-holder of the main chain conveyor, showing the relationship of the various parts in three different phases of the operation.

Referring first to Figs. 1, 2 and 3, 4 it can be seen that the intermediate chain conveyor provided at each operator's position comprises two parallel chains 2 and 3 each driven by a pair of cog-wheels 4, 5 and 6, 7 having the same diameter. The distance between the axes of these wheels is the same for each set, but the axes 8, 9 of one set are staggered with respect to those 10, 11 of the other set. The axes of these sets of wheels are parallel and located in the same plane.

The pairs of cog wheels 4, 5 and 6, 7 are driven from a common driving axis 12 by means of chains 13, 14 and cog-wheels 15, 16 and 17, 18 respectively. All the cog wheels 4, 5 and 6, 7 and 15, 16 and 17, 18 are journaled in a suitable frame the construction of which forms no part of the invention.

On the chains 2 and 3 are mounted supports such as 20—20', regularly spaced as shown in Figs. 1, 2, 3 and 4. For fixing the supports 20—20' to the chains, these supports comprise a frame 21 which receives the extremities of studs 22—23 forming part of spaced links 24—25 of the chains.

One stud 22 is fixed and mounted in the frame 21 whilst the other 23 slides in the stud-hole 26 of this same frame, so that the links comprised between the axes of studs 22—23 are able to pass over the curvature of wheels 4, 5, 6 and 7 and will straighten up in the straight sections of chains 2 and 3.

Each of the chains 2 and 3 comprises a like number of supports 20—20' and to provide for identical positions on each of the chains, there is obviously a displacement between supports 20—20' equal to the shift between axes 8, 9 and 10, 11 of wheels 4, 5 and 6, 7. The supports 20—20' are each further provided with a collar 28—28' respectively, of which the function will be explained later.

The letter-holders 29 of this intermediate chain conveyor 1, which will be described in detail with respect to Figs. 6, 7 and 8, must be maintained in exact relative positions even in the course of their translation. Whereas in the prior U.S. patent above referred to, this is obtained by means of a third chain, in the present invention use is made of two staggered chains 2 and 3 as above mentioned and the letter-holders 29 are fixed to chains 2 and 3 at two opposite points of a diagonal. These two points are denoted by journals 30—30' on a frame 31 supporting each letter-holder 29. These journals 30—30' engage respectively within the corresponding collars 28—28' of supports 20—20'.

A link is thus achieved between chains 2 and 3 by means of the frame 31, which rigorously maintains its position as will be easily understood by examination of Figs. 1, 2, 3 and 4.

On the frame 31 (Figs. 6, 7 and 8) are mounted the cheeks 32, 32' sustaining the trough 33 of the letter-holder 29 by means of spacing rods 34—35 and 34'—35'.

Between the side walls of the trough 33 and the cheeks 32—32' are fixed bearings 36—36'. These pass through stud-holes 37—37' in an extension 38—38' of a mobile sheath 39. The latter is similarly shaped to the trough 33 of which it is an extension of the smaller aperture 40 (Fig. 5). The large aperture 41 (Fig. 5) of the mobile sheath 39 is larger than the smaller aperture of the trough 33 and a certain amount of rotation of sheath 39 is allowed around the bearings 36—36' since the extensions 38—38' act as lever arms. This rotation is limited by the overlap between the edges of the large aperture 41 of the sheath 39 and those of the small aperture 40 of the trough 33. It will be noticed that the stud-holes 37—37' are elongated in the longitudinal direction of the extensions 38—38' so that the rotation radius of sheath 39 can be diminished according to the position occupied by the stud-holes 37—37' with respect to the bearings 36—36'.

On the extensions 38—38' are fixed two journals 42—42' on which are articulated the lever arms 43—43' of the shutter 44. The latter can therefore close or open the small orifice 45 of the sheath 39 by swinging around the journals 42—42'. The shutter 44 also follows all the displacements of the mobile sheath 39 since the same journals are rigidly connected to the sheath.

Finally (Figs. 5, 7 and 8), each of the arms 43—43' carries a peg, 46—46' respectively. Pegs 46—46' engage respectively in the curved stud-holes 47—47' made at one extremity of the respective inverter levers 48—48' which rotate around the journals 49—49' fixed to the extensions 38—38' of the mobile sheath 39. The other extremity of these levers 48—48' is ended by a fork, respectively 50—50'. Each of the forks 50—50' engages on one of the bearings, 36—36' respectively.

Between the cheeks 32—32' is threaded a shaft 51 (Fig. 8) on which are articulated the levers 52—52' (also partially shown in Fig. 7). These levers 52—52' are respectively forced back by springs 53—53' which rest on the one hand on the frame 31 and on the other hand on a stop pin 54 on each of the levers 52—52' (Figs. 5 and 7). In the absence of stresses (Figs. 5 and 8), the levers rest against the frame 31 or against an adjustable stop member (not shown). The levers 52—52' are connected by connecting rods respectively 55—55' to pivots 62—62' on either side of the shutter 44. The respective extremities of the connecting rods 55—55' are curved in a swan neck shape and are connected by a tubular brace 57 (shown in Fig. 7), which carries two rollers 58—58', one on each of its extremities. In this manner when pressing against the rollers 58—58' there is an upward component of force which causes the connecting rods 55—55' mounted on the sheath 39 to oppose the downward motion of this sheath under the action of gravity. It will be recalled that the mobile sheath 39 is suspended on the trough 33 by way of the bearings 36—36'. On the other hand, the mobile shutter 44 is suspended on the sheath 39 by way of the journals 42—42'.

Hence, since the trough 33 is moving downwards, and since the descent of the mobile sheath 39 carrying the mobile shutter 44 is resisted by way of the connecting rods 55—55', the bearings 36—36' mounted on the trough 33 will press the forked ends 50—50' of the inverter levers 48—48' pivotally mounted at 49 on the sheath 39. Hence, as the bearings 36—36' are able to slide downward through the stud-holes 37—37', the inverter levers 48—48' will pivot in an anti-clockwise manner whereby the pegs 46—46' able to slide in the curved stud-holes 47—47' will also be displaced in an anti-clockwise manner. These pegs 46—46' being integral with shutter 44, the latter will also pivot in an anti-clockwise manner around the journals 42—42' to unmask the small orifice 45 of the mobile sheath 39.

It will be seen later that the rotation of the mobile sheath 39 and its vertical translation with the subsequent opening of the shutter 44 are combined in the course of the conjunction with a letter-holder 59 of the main chain conveyor. The letter-holders of the main chain conveyor have been described in Belgian Patent No. 507,878.

In the present invention, the letter-holders 59 are provided with two profiled cleats such as 60, arranged as shown in Figs. 8, 9 and 10.

These cleats 60 are located on the trajectory of the rollers 58—58'.

There will now be explained in detail a conjunction between a letter-holder, such as 29, of the intermediate chain conveyor and a letter-holder, such as 59, of the main chain conveyor.

In the prior United States patent referred to it is the encounter between a letter-holder of the intermediate chain conveyor and a letter-holder of the main chain conveyor which causes the opening of the shutter of the letter-holder on the intermediate chain conveyor.

In the present invention, however, the linear speed of the letter-holders of the intermediate chain conveyor is substantially reduced with respect to the speed of the chain itself so as to facilitate the transfer.

Thus the frames 31 of the letter-holders 29 are mounted at a certain distance from chains 2 and 3 by means of the supports 20—20' (Figs. 1, 2, 3 and 4). In this manner, as long as a letter-holder is on the straight positions of the chains, the linear speed of these latter and of the letter-holder 29 are equal. But as soon as a letter-holder 29 follows the curvature of chains 2 and 3 (Fig. 8), the gyration radius ($r$) of the journals 30—30' becomes smaller than the gyration radius ($R$) of the axes 22 and 23 which fix the supports 20—20' on the chains 2 and 3. This results in a reduction of the linear speed of the letter-holders 29 with respect to the driving chains 2 and 3. Since the linear speed of the main chain conveyor is constant, a difference occurs between these two speeds in the approach to the zone of conjunction which results in a backward shift of the letter-holder 29 with respect to the letter-holder 59 of the main chain conveyor.

However, the linear speed of the letter-holders 29 is increased gradually as the supports 20—20' draw nearer to the straight positions of chains 2 and 3, that is, as the chains straighten out.

Fig. 8 shows the relative positions of a letter-holder 29 of the intermediate chain conveyor and a letter-holder 59 of the main chain conveyor in the approaches of the conjunction zone.

In Fig. 9, the linear speed of the letter-holder 59 being still greater than the one of the letter-holder 29, the cleats 60 encounter the rollers 58—58' and urge them to the speed of the main chain conveyor, which produces, because of such difference of speed, the rotation of the sheath 39 around its bearings 36—36' via the connecting rods 55—55' and the pivots 62—62'.

Advantage is thus taken of the difference between the respective linear speeds of the letter-holders of the two chains to cause a secure conjunction between these letter-holders.

In Fig. 9, the small orifice 45 of the mobile sheath 39, closed by the shutter 44, comes into a position above the letter-holder 59 of the main chain conveyor since the distance between the center of the rollers 58—58' and the pivots 62—62' represents the radius of a circle along which the median axis of the orifice slides to correspond to the median axis of the letter-holder 59.

The mobile sheath 39 is maintained in this position by the tension of the restoring springs 53—53' acting on levers 52—52' and the connecting rods 55—55' so as to keep the rollers 58—58' pressed against the profile of the corresponding cleats 60.

In Fig. 10, the letter-holder 29 of the intermediate chain conveyor and the letter-holder 59 of the main chain conveyor having drawn nearer, the connecting rods 55—55' are caused to pivot around the rollers 58—58' and to force downwards the mobile sheath 39 towards the letter-holder 59. But, the trough 33 is moved by the supports 20—20' and as soon as these assume the straight alignment of chains 2 and 3, the journals 30—30' have again the same linear speed as the axes 22, 23.

The trough 33 therefore moves downwardly more rapidly than the sheath 39 since the downward motion of the latter is controlled by the ratio between the lever arms 54—54' and the connecting rods 55—55'.

The speed difference between the downward motion of the trough 33 and the downward motion of sheath 39 creates a relative motion of the bearings 36 with respect to the journals 49 which results in the pivoting of levers 48—48' which are articulated on the one hand on journals 49—49' and on the other hand on bearings 36—36'.

By this pivoting, the stud-holes 47—47' of levers 48—48' drive the pegs 46—46' of the shutter 44 which thus pivots around its journals 42 and unmasks the orifice 45 of the mobile sheath.

As soon as the axes 22 and 23 assume again the straight alignment of the chains 2 and 3, the opening 45 of the mobile sheath 39 penetrates slightly inside the letter-holder 59, but the mechanism keeps approximately the aspect shown in Fig. 10.

The first phase of the conjunction is over and if a letter is contained in the trough 33 and the extension formed by the mobile sheath 39, this letter falls in the letter-holder 59 of the main chain conveyor.

During the second phase, the letter-holders 29 and 59 remain in conjunction.

The third phase starts when the letter-holder 29 next enters the following curvature of the intermediate chain conveyor and is separated from the letter-holder 59 of the main chain conveyor.

The withdrawal of letter-holder 29 causes the rotation of the connecting rods 55—55' around the rollers 58—58' and relative motions of the sheath 39 and the trough 33 reverse from those described previously, so that the levers 48—48' pivot and swing the shutter 44, but this time in the direction corresponding to the closure of the orifice 45. The mechanism of the letter-holder 29 takes again the aspect shown in Fig. 8, except that supports 20 and 20' occupy now the symmetrically opposed position.

The fourth phase lasts until a new cycle starts.

While the principles of the invention have been described above in connection with specific apparatus, it is to be clearly understood that this description is made only by way of example and not as a limitation on the scope of the invention. It will be appreciated, for example, that flexible belt type conveyors could be used in place of chain type conveyors.

I claim:
1. Sorting machine for letters and like flat objects comprising a main conveyor carrying a first plurality of main letter-holders, an intermediate conveyor synchronized with said main conveyor and carrying a second plurality of intermediate letter-holders and means for transferring flat objects from said intermediate letter-holders to said main letter-holders, wherein said intermediate conveyor comprises a pair of staggered flexible endless driven members, means for driving said members at the same linear speeds, each intermediate letter-holder comprising a rectangular frame member, a pair of supports secured one to each of said staggered driven members, a pair of bearings mounted respectively on said supports and cooperating respectively with pivots mounted at opposite points of a diagonal of said rectangular frame member, latch means for transferring objects from said intermediate letter-holder to a main letter-holder, said latch means extending in the path of travel of said main letter-holders, means for reducing the linear speed of each of said intermediate letter-holders as they approach a predetermined point in their path of travel whereby one of said main letter-holders may actuate said latch means due to the differential in linear speed between it and said slower-moving intermediate holder.

2. Sorting machine as claimed in claim 1, wherein each said letter-holder of said intermediate conveyor is rigidly attached to a respective rectangular frame member, and further comprising an outlet aperture at the base of said letter-holder, a movable sheath member pivoted on bearings on said letter-holder and having an opening in substantial alignment with said aperture, and an outlet shutter for masking and unmasking said opening of said movable sheath member, said movable sheath being so articulated on said bearings on said letter-holder as to be free to perform both a radial movement and a rotary movement with respect to a centre of rotation on said letter-holder.

3. Sorting machine as claimed in claim 2, further comprising lever linkage between said movable sheath and said outlet shutter adapted to move said outlet shutter to its unmasking position responsive to a radial movement of said movable sheath.

4. Sorting machine as claimed in claim 3, in which said lever linkage comprises an intermediate double-armed lever pivoted on said movable sheath, the end of one arm being tongued to receive a pin mounted on said letter-holder and the end of the other arm being formed with a cam surface, and a pin mounted on said outlet shutter in such position as to ride on said cam surface.

5. Sorting machine as claimed in claim 4, wherein a letter-holder of said first plurality is provided with a stop member and the movement of said movable sheath is controlled by a detecting lever positioned to engage said stop member and mounted at a point intermediate its ends on a bearing on said movable sheath, one end of said lever being provided with means for engaging said stop member and the other end being connected to said letter-holder frame member by a link member.

6. Sorting machine for letters and like flat objects comprising a main flexible conveyor carrying a plurality of main letter-holders for conveying a flat object to a required destination, an intermediate flexible conveyor located at an operator's position comprising a pair of staggered, flexible, endless, driven members and synchronized with said main conveyor and having mounted thereon a plurality of intermediate letter-holders for transferring flat objects from said operator's position to said main letter-holders, each of said intermediate holders comprising: support members for mounting said intermediate letter-holders on said intermediate conveyor in such a position as to maintain them a certain distance away from said intermediate conveyor, means for transferring objects from said intermediate letter-holders to said main letter-holders, said transfer means adapted to be actuated by a main letter-holder, means for reducing the linear speed of each of said intermediate letter-holders as they approach a predetermined point in their path of travel whereby one of said main letter-holders may actuate said transfer means due to the differential in linear speed between it and said slower-moving intermediate holder, said speed-reducing means comprising the staggered displacement of the end curves of said intermediate conveyor whereby in the travel around said curves, the instantaneous center of rotation of said intermediate letter-holders is located on a circumference having a smaller radius than the radius of curvature of said intermediate flexible conveyor.

References Cited in the file of this patent
UNITED STATES PATENTS

| | | |
|---|---|---|
| 466,041 | Hunt | Dec. 29, 1891 |
| 1,684,675 | Lemmon | Sept. 18, 1928 |
| 2,000,417 | Perry et al. | May 7, 1935 |

FOREIGN PATENTS

| | | |
|---|---|---|
| 532,031 | France | Nov. 5, 1921 |